Sept. 27, 1966 J. M. BERGEY 3,275,767

VELOCIMETER INCORPORATING A DRAG DISC
WITH CONDUCTIVE LAMINATIONS

Filed Aug. 4, 1964 2 Sheets-Sheet 1

INVENTOR.
JOHN M. BERGEY
BY Le Blanc and Shur
ATTORNEYS.

Sept. 27, 1966 J. M. BERGEY 3,275,767
VELOCIMETER INCORPORATING A DRAG DISC
WITH CONDUCTIVE LAMINATIONS
Filed Aug. 4, 1964 2 Sheets-Sheet 2

INVENTOR.
JOHN M. BERGEY
BY Le Blanc & Shur
ATTORNEYS.

United States Patent Office 3,275,767

Patented Sept. 27, 1966

3,275,767

VELOCIMETER INCORPORATING A DRAG DISC WITH CONDUCTIVE LAMINATIONS

John M. Bergey, Lancaster, Pa., assignor to Hamilton Watch Company, Lancaster, Pa., a corporation of Pennsylvania Filed Aug. 4, 1964, Ser. No. 387,370
14 Claims. (Cl. 200—61.45)

This invention relates to a velocimeter and more particularly to an eddy-current damped, single integrating *g*-second switch. While basically a switch, the magneto-mechanical device of the present invention can also be used as the intelligence component for distance measuring mechanisms, and is useful in fuzing systems and rate-sensitive devices. It is capable of sensing imposed inertial (acceleration) forces, performing a continuous single integration, and providing an accurate velocity analog output.

As is well known when a conductor is moved through magnetic field, there is induced in that conductor a current whose own magnetic field retards the motion. If the magnetic field is not uniform over the whole conductor there are closed paths within that conductor along which there is an electromotive force not equal to zero; hence, currents are established along these paths. These currents induced in the body of a conductor, as distinguished from currents induced in wires, are generally called Foucault or eddy currents.

Although devices of the general type herein disclosed have been proposed in the past for use in integrating accelerometers, they have not been particularly suited for use as switches due to the limited amount of torque available to provide a switching function. In addition, stray magnetic fields have been a serious problem tending to deleteriously affect the overall accuracy of known constructions. Both problems are substantially overcome in the novel *g*-second switch of this invention by incorporating a laminated rotatable magnetic drag disc in conjunction with novel magnetic circuitry to provide an increased output torque capable of switch actuation in a small unit having an overall diameter of less than 1¼ inches and a length of approximately the same dimensions.

The conductor or drag disc consists of a laminated copper disc approximately 1.00 inch in diameter and 0.050 inch thick. When positioned perpendicular to the magnetic lines of force created by the permanent magnets, the eight laminations of the disc provide more eddy current paths than an equivalent solid drag disc. Twelve platinum cobalt magnets approximately 0.080 inch diameter by 0.090 inch long provide the necessary magnetic field. These magnets are set in a hexagonal pattern with opposing poles shunted. The magnet retainer plates, gearing, and remaining hardware are all fabricated from non-ferrous metal to prevent unwanted interaction with the magnetic portions of the device.

The sensing and drive masses of the unit consist of two meshing gear sectors filled with lead in order to gain more drive torque from the increased weight. Acceleration forces act on the drive mass centers of gravity and cause the sectors to rotate. This rotational motion is transduced to a usable form by a step-up gear train located between the drive masses and the drag disc; hence, the rotational speed of the disc is a direct function of the acceleration force imparted to the drive masses. In order to obtain the first integral of the sensed acceleration, i.e., velocity, a retarding or braking force proportional to the disc speed must be available. This is accomplished by the opposing Foucault currents in the laminated drag disc.

It is therefore one object of the present invention to provide an improved velocimeter.

Another object of the present invention is to provide a novel *g*-second switch.

Another object of the present invention is to provide a velocimeter having an increased output torque.

Another object of the present invention is to provide a velocimeter having an improved magnetic circuit substantially eliminating the effects of stray magnetic fields.

Another object of the present invention is to provide a velocimeter incorporating a laminated eddy current drag disc.

These and further objects and advantages of the invention will be more apparent upon reference to the following specification, claims and appended drawings wherein:

Figures 1, 2, 3:
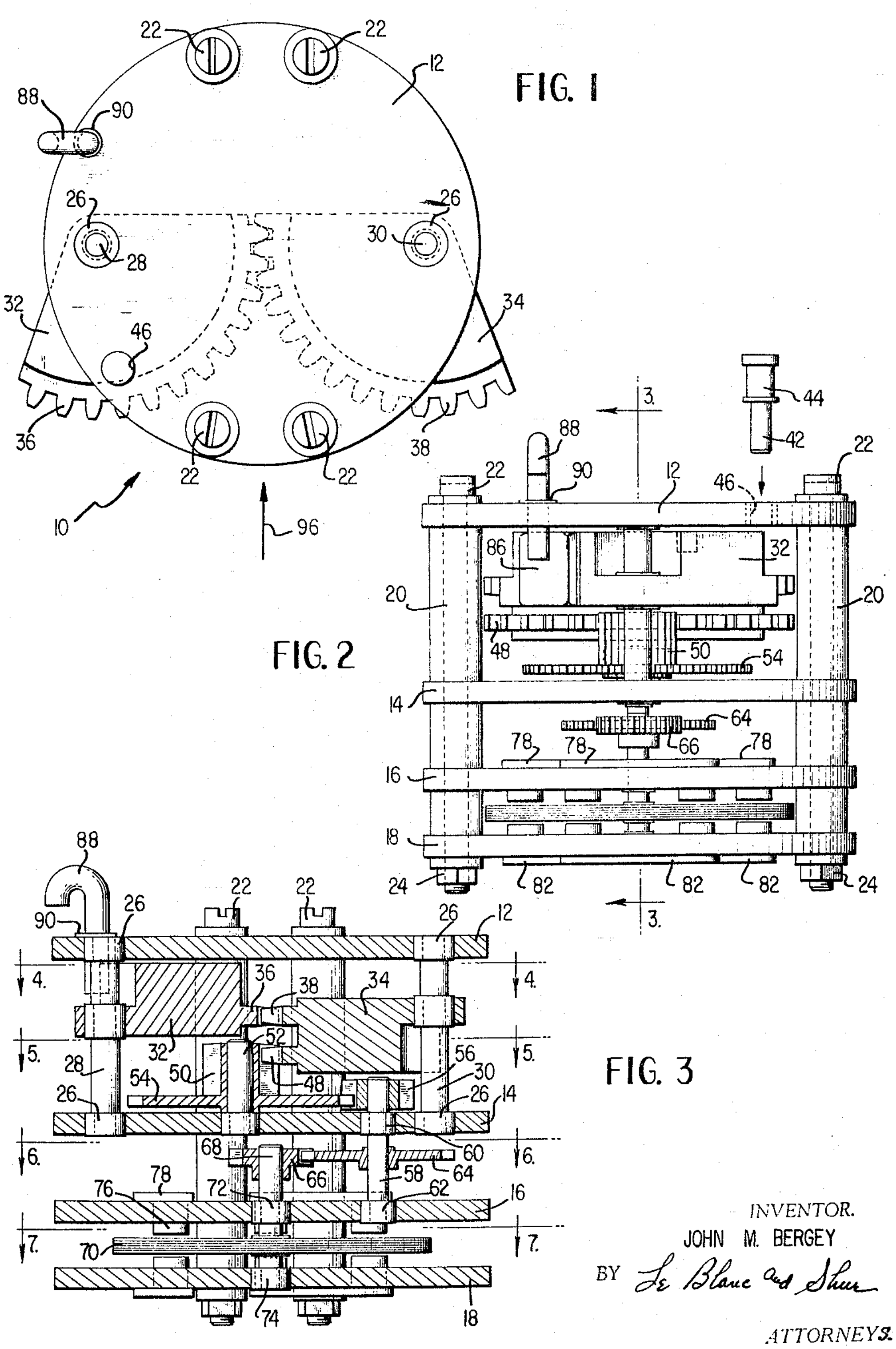
FIG. 1 is a plan view of the velocimeter of the present invention.
FIG. 2 is an elevational view of the velocimeter of FIG. 1.
FIG. 3 is a vertical cross-section taken along line 3—3 of FIG. 2.

Referring to the drawings, the velocimeter of the present invention generally indicated at 10 comprises four spaced parallel circular plates including a top plate 12, a center plate 14, a top retainer plate 16, and a bottom retainer plate 18. The four plates are joined together by suitable pillars such as are indicated at 20, receiving four long screws 22, which have threadedly received over their lower ends the nuts 24.

Figures 4, 5, 6, 7:
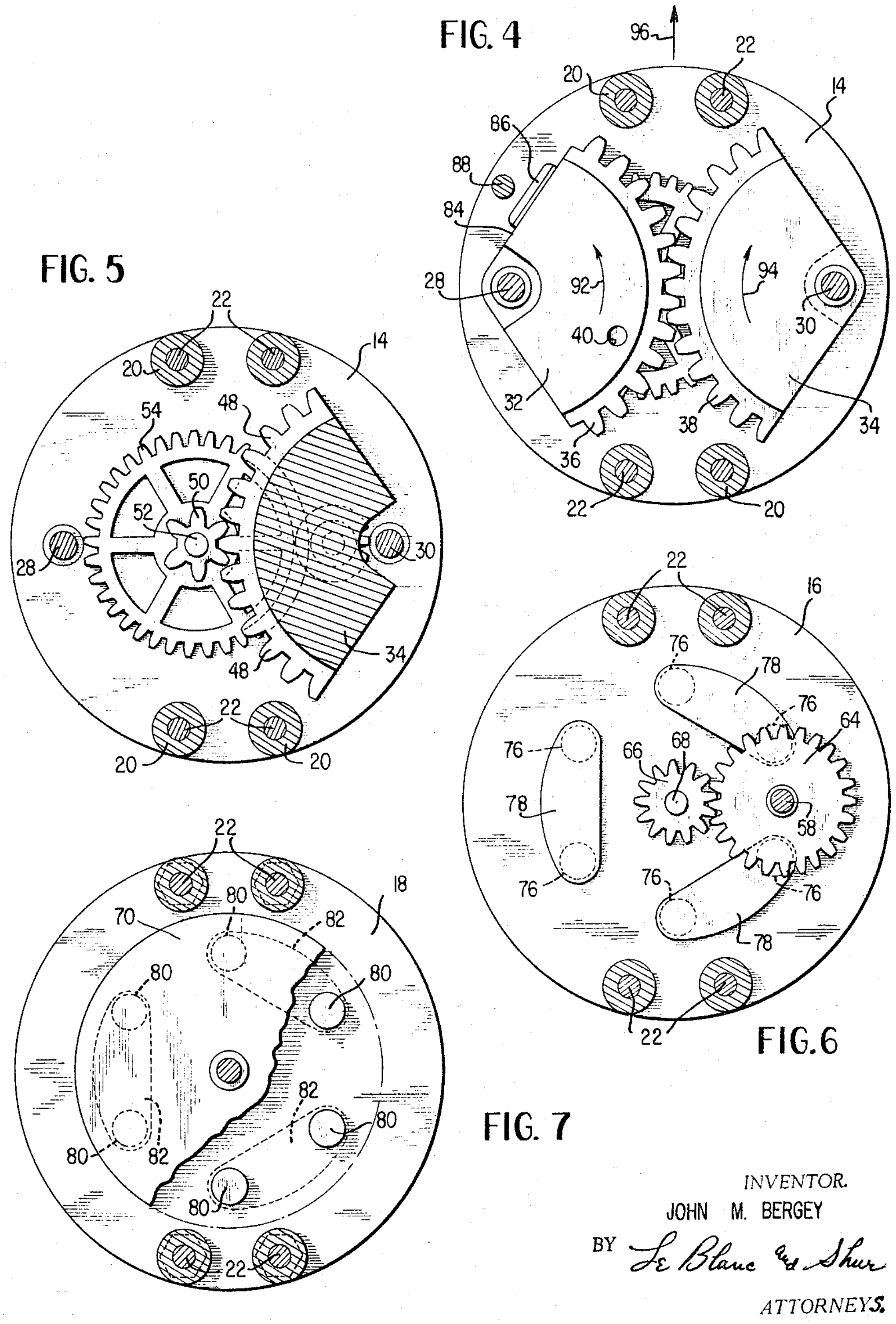
FIG. 4 is a cross-section taken along line 4—4 of FIG. 3.
FIG. 5 is a cross-section taken along line 5—5 of FIG. 3.
FIG. 6 is a cross-section taken along line 6—6 of FIG. 3.
FIG. 7 is a cross-section taken along line 7—7 of FIG. 3.

As best seen in FIG. 3, plates 12 and 14 each carry a pair of spaced ball bearings 26, rotatably receiving the respective ends of a pair of vertical mass supporting shafts 28 and 30. Rigidly attached to the shafts 28 and 30 are the inertial masses 32 and 34, preferably filled with lead to increase their weight and provided with intermeshing sector gears 36 and 38. As best seen in FIG. 4, inertial mass 32 is provided with a hole or cavity 40, adapted to receive the reduced diameter end 42 of a removable stop pin 44 illustrated in FIG. 2, which pin passes through a suitable aperture 46 formed in the top plate 12, as best seen in FIGS. 1 and 2. Stop pin 44 may be spring loaded in a well known manner if desired.

Inertial mass 34 carries a second sector gear 48 as illustrated in FIG. 5, which meshes with a drive pinion 50 rotatably carried by a stub shaft 52. Rotatable with drive pinion 50 is a drive gear 54, which meshes with a second pinion 56, mounted on and rotatable with shaft 58 supported by bearings 60 and 62 in the circular plates 14 and 16.

Mounted for rotation on the shaft 58 and movable with the pinion 56 is a second gear 64. This gear meshes with a pinion 66, illustrated in FIG. 6 as rigidly mounted on the center shaft 68, which carries intermediate its ends laminated drag disc 70. Shaft 68 is rotatably mounted in ball bearings 72 and 74 in the top retainer plate 16 and bottom retainer plate 18 respectively.

Held by the upper retainer plate 16 and spaced about the drag disc 70 are six platinum-cobalt permanent magnets approximately 0.80 inch in diameter and 0.90 inch long which magnets are indicated by dash lines in FIG. 6 at 76.

These six magnets are arranged in a hexagonal configuration about the center shaft 68 and will be hereinafter referred to as the upper magnets. Opposite poles of adjacent magnets 76 are joined by three magnetic keepers or shunts of magnetic material 78 to reduce stray magnetic fields.

In a similar manner bottom retainer plate 18 supports six identical magnets 80, best seen in FIG. 7, again with adjacent magnets having opposite poles joined by three keepers or magnetic shunts 82. Thus, the magnetic field through the drag disc forms three rectangular closed loops passing from the pole of one of the magnets 76 downwardly through the drag disc into the opposite pole of the aligned lower magnet 80, through the lower keeper 82, from the adjacent lower magnet 80 coupled to that keeper upwardly through the drag disc, through the opposite pole of the vertically aligned upper magnet 76 and back through the keeper 78 to the first of the four magnets involved in each loop.

As best seen in FIG. 4 inertial mass 32 carries along its leading edge 84 a switch contact bar 86, adapted to engage an insulated switch terminal 88 which passes through a suitable aperture in the top plate 12, but is insulated therefrom by epoxy resin or other insulation 90. Thus, engagement of the contact 86 with the contact 88 serves to complete a suitable electrical connection in which a power supply (not shown) is connected through a device to be actuated to the contact 88 and the other side of the power supply is connected to the center plate 14 and through the bearing 26 and shaft 28 to mass 32 and hence contact 86. The side of the power supply connected to contact 86 is preferably grounded.

Consider a flat cylindrical disc conductor of radius $r$, spinning on its axis between the poles of a magnet. Let the polar gap between the opposing magnets shown on FIGURE 2 and 3 have a breadth $b$ and axial length $l$ and let the field within the gap be B. Now, if R is the electrical resistance of the current path and $\omega$ is the angular velocity of the disc, the current I generated will be:

$$I=\frac{Blr\omega}{R}$$

Now the force between the conductor and magnet is $F=BIl$; hence the torque T will be $Fr$ or:

$$T=\frac{B^2l^2r^2\omega}{R} \qquad (1)$$

If the disc extends axially for some distance beyond the poles in both directions, R becomes simply proportional to the resistance of the metal in the gap. This resistance is $\rho l/bt$, $t$ being the thickness of the metal and $\rho$ its specific resistance; therefore, $$R=\frac{k\rho l}{bt} \qquad (2)$$

The value of $k$ depends on the shape of the polar area and on the extent of the conductor outside that area. The value of $k$ for this configuration would probably be around 3.0. Using the above listed equation for R and substituting:

$$T=\frac{B^2l^2r^2\omega bt}{k\rho l} \qquad (3)$$

Multiplying both numerator and denominator of this equation by $b$ and substituting $H=Blb$ where H is the total induction through the disc, the equation becomes:

$$T=\frac{H^2r^2\omega t}{k\rho bl} \qquad (4)$$

For any given physical configuration (such as that described herein) Equation 4 can be generalized to state that the retarding or braking torque $T=k'\omega$; thus the rotational speed of the system is the only variable in this discussion. This feature enables the device to function as a velocimeter.

The device responds to the equation $v=v_0+at$, where:

$v$=velocity value to be measured
$v_0$=initial velocity
$a$=acceleration imparted to the velocimeter
$t$=time acceleration is available, seconds Since $v_0$ is zero as the missile starts from rest, the equation reduces to $v=at$.

Operation of the $g$-second switch begins when the preferably spring-loaded release pin 44 is withdrawn from the receiving hole or cavity 40 located in the drive mass 32. This allows the unbalanced drive masses 32 and 34 to rotate in the direction of the arrows 92 and 94 in FIG. 4 when the device is subject to acceleration forces in the direction of the arrows 96 of FIGS. 1 and 4. Drive mass 34 is provided with the two sector gears 38 and 48, the former coupling the resulting drive torque of mass 32 to mass 34 and the other sector gear transmitting the total drive torque to the step-up gear train. Both drive masses are rigidly attached to shafts 28 and 30 while ball bearings 26 are provided at the ends of the rotatable shafts to minimize friction losses within the system.

The relatively slow speed drive end of the device is converted to higher speed rotation at the eddy current disc end of the gear train by the step-up gear transmission. This gear train includes the drive pinion 50, drive gear 54, second pinion 56, second gear 64, and center pinion 66. The center pinion is rigidly attached to the integrating disc 70 by the center shaft 68.

The eddy current damping is provided by the six magnetic fields passing through the laminated disc 70 with six permanent magnets spaced in a hexagonal pattern in the top retainer plate 16 and six similar magnets placed in the same pattern in the bottom retainer plate 18 and having unlike poles facing each other. Thus, the magnets form three substantially closed magnetic loops through the drag disc or eddy current disc 70. Disc 70 preferably is formed of laminated copper provided with eight laminations so as to have approximately a 1 inch diameter and a total thickness of 0.05 inch. When positioned perpendicular to the magnetic lines of force created by the permanent magnets the laminated construction provides a substantial increase in eddy current paths over an equivalent solid drag disc. In this way the device provides increased torque from a much smaller size unit and the switch contacts 86 and 88 close at a switching point which represents a discreet velocity, that is the rotational position of the drive mass 34 is analogous to a discreet velocity value.

It is apparent from the above that the present invention provides an improved velocimeter which develops an output proportional to the velocity and in the preferred embodiment forms an improved high torque $g$-second switch. Since the rotational position of the drive mass represents a discreet velocity value a switching point can be incorporated so that contact closure of the switch is made at the selected velocity value. A prototype device constructed in accordance with the present invention switched at a 626 $g$-second product, regardless of acceleration input. Acceleration inputs varied from 2.5 $g$ to 60 $g$. The measured velocity varied an average of 1.7% over a 50 $g$ input range. Greater velocities can be achieved by increasing the mass of the drive sensors. Repeatability, that is the variation within a given $g$-force input, was better than 1% throughout the operational range of the velocimeter. By adjustably mounting the switch contact 86 on drive mass 32 it is possible by adjusting its position to achieve a switching function at any pre-selected velocity.

Because of the unique magnetic circuitry involving substantially closed loops, the problems of stray magnetic fields adversely affecting other parts of the mechanism are significantly minimized. The magnet retainer plates 16 and 18, the gearing and the remaining hardware are preferably all fabricated from non-ferrous metals to further prevent unwanted interaction of the magnetic field with these elements.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A velocimeter comprising an eccentrically mounted mass subject to rotation under the influence of acceleration forces, means coupled to said mass for actuation by movement thereof, a rotatable element having a plurality of conductive laminations coupled to and driven by said mass, and means for passing a magnetic field through said laminated element.

2. A velocimeter according to claim 1 wherein said magnetic field means comprises means for forming a substantially closed metallic magnetic loop having a pair of short air gaps through which said element passes.

3. A velocimeter comprising an eccentrically mounted mass subject to rotation under the influence of acceleration forces, means coupled to said mass for actuation by movement thereof, a drag disc of copper laminations, step up gear means coupling said mass to said magnetic drag disc, and means for passing a plurality of magnetic fields perpendicularly through said disc.

4. A velocimeter according to claim 3 wherein said magnetic field means comprises a plurality of stationary permanent magnets.

5. A velocimeter comprising a pair of eccentrically mounted masses subject to rotation under the influence of acceleration forces, said masses having meshing sector gears, switch means actuatable in response to movement of said masses, a rotatably mounted disc having a plurality of conductive laminations, step up gear means coupling said masses to said disc, and a plurality of stationary permanent magnets mounted on opposite sides of said disc for inducing eddy currents in said laminations upon rotation of said disc.

6. A velocimeter according to claim 5 wherein one of said masses is provided with an additional sector gear meshing with the first gear of said step up gear means.

7. A velocimeter comprising four spaced parallel plates, a pair of shafts having their ends rotatably received in the first and second of said plates, a pair of eccentric masses rigidly mounted on said shafts, a switch contact passing through and insulated from said first plate, a movable contact carried by one of said masses and movable therewith into engagement with said switch contact, said masses having intermeshing sector gears, a disc having a plurality of conductive laminations rotatably mounted between the third and fourth of said plates, a step up gear train coupling one of said masses to said disc, and a plurality of permanent magnets supported by said third and fourth plates providing magnetic fields intercepting said disc.

8. A velocimeter according to claim 7 wherein at least said third and fourth plates are made of non-ferrous metal.

9. A velocimeter comprising four spaced parallel plates, a pair of shafts having their ends rotatably received in the first and second of said plates, a pair of eccentric masses rigidly mounted on said shafts, a switch contact passing through and insulated from said first plate, a movable contact carried by one of said masses and movable therewith into engagement with said switch contact, said masses having intermeshing sector gears, an additional sector gear on one of said masses, a disc having a plurality of conductive laminations rotatably mounted between the third and fourth of said plates, a step up gear train coupling said additional sector gear to said disc, a first group of magnets supported by said third plate on one side of said disc, and a second group of magnets supported by said fourth plate on the other side of said disc, individual magnets in each group being aligned with respective magnets in the other group with their opposite poles facing each other.

10. A velocimeter according to claim 9 wherein each of said group of magnets includes an even number of magnets arranged in corresponding pairs on opposite sides of said disc, and magnetic shunt means joining the poles of each pair remote from said disc.

11. A velocimeter comprising four spaced parallel plates, a pair of shafts having their ends rotatably received in the first and second of said plates, a pair of eccentric masses rigidly mounted on said shafts, a switch contact passing through and insulated from said first plate, a movable contact carried by one of said masses and movable therewith into engagement with said switch contact, said masses having intermeshing sector gears, an additional sector gear on one of said masses, a disc having a plurality of conductive laminations rotatably mounted between the third and fourth of said plates, a step up gear train coupling said additional sector gear to said disc, a first group of six permanent magnets arranged in a hexagonal configuration about the rotational axis of said disc and supported in said third plate, a second group of six permanent magnets each aligned with a different one of said first group along an axis parallel to said rotational axis and supported in said fourth plate, adjacent magnets in said first group having unlike poles facing said disc, the magnets on common axes having unlike poles facing each other.

12. A velocimeter according to claim 11 wherein the unlike poles of each pair of adjacent magnets remote from said disc are joined by magnet shunts.

13. A velocimeter according to claim 12 wherein said third and fourth plates are non-rotatably mounted in said velocimeter, said magnets being rigidly secured to said plates.

14. A velocimeter according to claim 13 wherein said disc is provided with eight conductive laminations.

References Cited by the Examiner

UNITED STATES PATENTS

| | | | |
|---|---|---|---|
| 2,596,649 | 5/1952 | Butler | 200—92 |
| 3,157,757 | 11/1964 | Lorenz | 200—61.53 |
| 3,180,951 | 4/1965 | Preisz | 200—61.53 |
| 3,183,724 | 5/1965 | McQuillen | 200—61.46 |

BERNARD A. GILHEANY, *Primary Examiner.*

ROBERT K. SCHAEFER, *Examiner.*

B. DOBECK, *Assistant Examiner.*